United States Patent
Zewail et al.

(10) Patent No.: US 12,537,730 B1
(45) Date of Patent: Jan. 27, 2026

(54) DIFFERENT SYMBOL LENGTHS FOR A-IOT INVENTORY ROUNDS

(71) Applicant: QUALCOMM Incorporated, San Diego, CA (US)

(72) Inventors: Ahmed Abdelaziz Ibrahim Abdelaziz Zewail, San Diego, CA (US); Chengjin Zhang, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/787,733

(22) Filed: Jul. 29, 2024

(51) Int. Cl.
*H04L 27/04* (2006.01)
*H04W 28/08* (2023.01)
*H04W 28/24* (2009.01)

(52) U.S. Cl.
CPC ......... *H04L 27/04* (2013.01); *H04W 28/0967* (2020.05); *H04W 28/24* (2013.01)

(58) Field of Classification Search
CPC .... H04L 27/04; H04W 28/24; H04W 28/0967
See application file for complete search history.

(56) References Cited

U.S. PATENT DOCUMENTS

2025/0203517 A1* 6/2025 Cheng ............... H04W 56/0015

OTHER PUBLICATIONS

Han S (Intel Corporation)., et al., "Evaluations on LP-WUS", 3GPP Draft, 3GPP TSG RAN WG1 #112, R1-2300969, Type Discussion, FS_NR_LPWUS, 3rd Generation Partnership Project, Mobile Competence Centre, 650, Route Des Lucioles, F-06921 Sophia-Antipolis Cedex, France, vol. Ran WG1, No. Athens, GR, Feb. 27-Mar. 3, 2023, Feb. 17, 2023, XP052248112, 13 pages, p. 9.
International Search Report and Written Opinion—PCT/US2025/033404—ISA/EPO—Sep. 29, 2025 (2405209WO).
OPPO: "Discussion on Study of Ambient IoT in Rel-19", 3GPP Draft, 3GPP TSG RAN meeting #101, RP-231774, 3rd Generation Partnership Project, Mobile Competence Centre, 650, Route Des Lucioles, F-06921 Sophia-Antipolis Cedex, France, vol. Tsg Ran, No. Bangalore, India, Sep. 11-15, 2023, Sep. 4, 2023, 6 pages, XP052515102, p. 3.

* cited by examiner

*Primary Examiner* — Rahel Guarino
(74) *Attorney, Agent, or Firm* — Procopio, Cory, Hargreaves & Savitch LLP

(57) ABSTRACT

An apparatus may be configured to determine at least one symbol duration for communicating through OOK modulation with a set of devices, the at least one symbol duration being determined based on one or more of at least one SNR requirement, at least one BLER requirement, or at least one target MDP requirement for the set of devices. The apparatus may also be configured to transmit, for each determined symbol duration of the at least one symbol duration, an OOK transmission with the determined symbol duration.

20 Claims, 7 Drawing Sheets

DIFFERENT SYMBOL LENGTHS FOR A-IOT INVENTORY ROUNDS

TECHNICAL FIELD

The present disclosure relates generally to communication systems, and more particularly, to optimizing the symbol durations in radio frequency identification (RFID)-based inventory system for Internet of Things (IoT) devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type e communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method and an apparatus are provided. The apparatus may comprises at least one memory; and at least one processor coupled to the at least one memory and, based at least in part on information stored in the at least one memory, the at least one processor, individually or in any combination, may be configured to: determine at least one symbol duration for communicating through OOK modulation with a set of devices, the at least one symbol duration being determined based on one or more of at least one SNR requirement, at least one BLER requirement, or at least one target MDP requirement for the set of devices; and transmit, for each determined symbol duration of the at least one symbol duration, an OOK transmission with the determined symbol duration.

In an aspect of the disclosure, a method and an apparatus are provided. The apparatus may comprises at least one memory; and at least one processor coupled to the at least one memory and, based at least in part on information stored in the at least one memory, the at least one processor, individually or in any combination, may be configured to: determine a first symbol duration for OOK modulation associated with one or more of an SNR requirement, a BLER requirement, or a target MDP requirement for the apparatus; receive, from a reader device, an OOK transmission with a second symbol duration; and transmit, to the reader device, a second OOK transmission in response to the received OOK transmission when the second symbol duration is the same as the first symbol duration.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
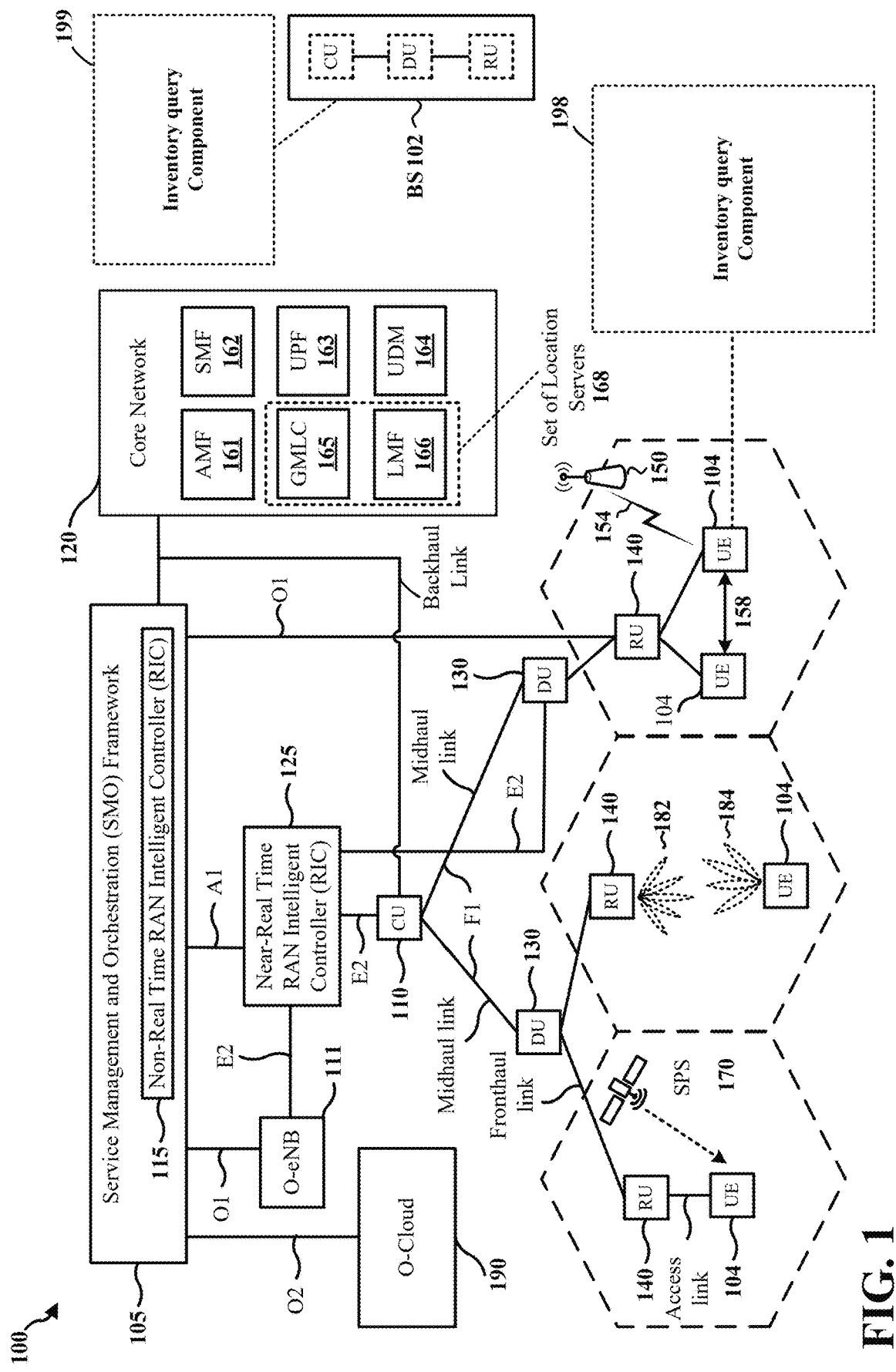
FIG. 1 is a diagram illustrating an example of a wireless communications system and an access network.

Various aspects relate generally to communication systems. Some aspects more specifically relate to optimizing symbol durations in radio frequency identification (RFID)-based inventory systems for Internet of Things (IoT) devices. In some examples, when performing RFID-based inventory queries for IoT devices, at least one symbol duration for communicating through on-off keying (OOK) modulation with a set of IoT devices may be determined based on one or more of the following: at least one signal-to-noise ratio (SNR) requirement, at least one block error rate (BLER) requirement, or at least one target missed detection probability (MDP) requirement for the set of devices. For each determined symbol duration, an OOK transmission with the determined symbol duration may be transmitted to perform the inventory query (e.g., obtaining information from the ambient-IoT (A-IoT) devices and/or for other IoT applications).

Particular aspects of the subject matter described in this disclosure can be implemented to realize one or more of the following potential advantages. In some examples, by configuring OOK transmissions used for IoT applications (e.g., inventory queries) with different symbol durations determined based on varying SNR requirements, BLER requirements, and/or target missed detection probability requirements for different IoT devices, the described techniques can enhance the efficiency and reliability of the inventory queries in IoT environments.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUS 130, RUs 140 and Near-RT RICs 125. In some implementations, the SMO Framework 105 can communicate with a hardware aspect of a 4G RAN, such as an open eNB (O-cNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an inventory query component 198 that may be configured to perform inventory query for IoT devices disclosed herein. In certain aspects, the base station 102 may have an inventory query component 199 that may be configured to perform inventory query for IoT devices disclosed herein. As noted above, by configuring OOK transmissions used for inventory queries with different symbol durations determined based on different SNR requirements, BLER requirements, and/or target missed detection probability requirements for different A-IoT devices, the described techniques can be used to enhance the efficiency and reliability of those inventory queries in IoT environments.

Figure 2:
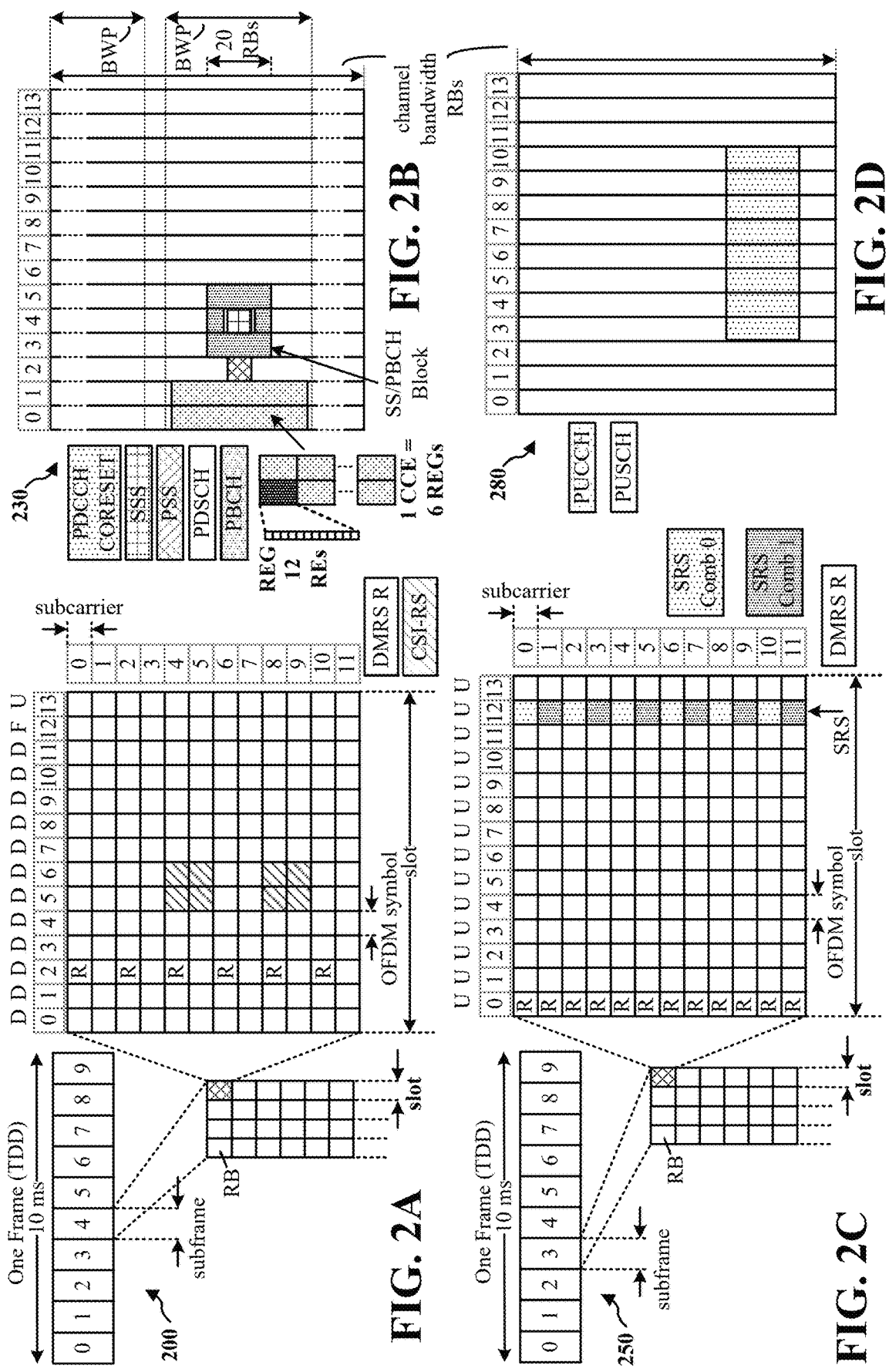
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
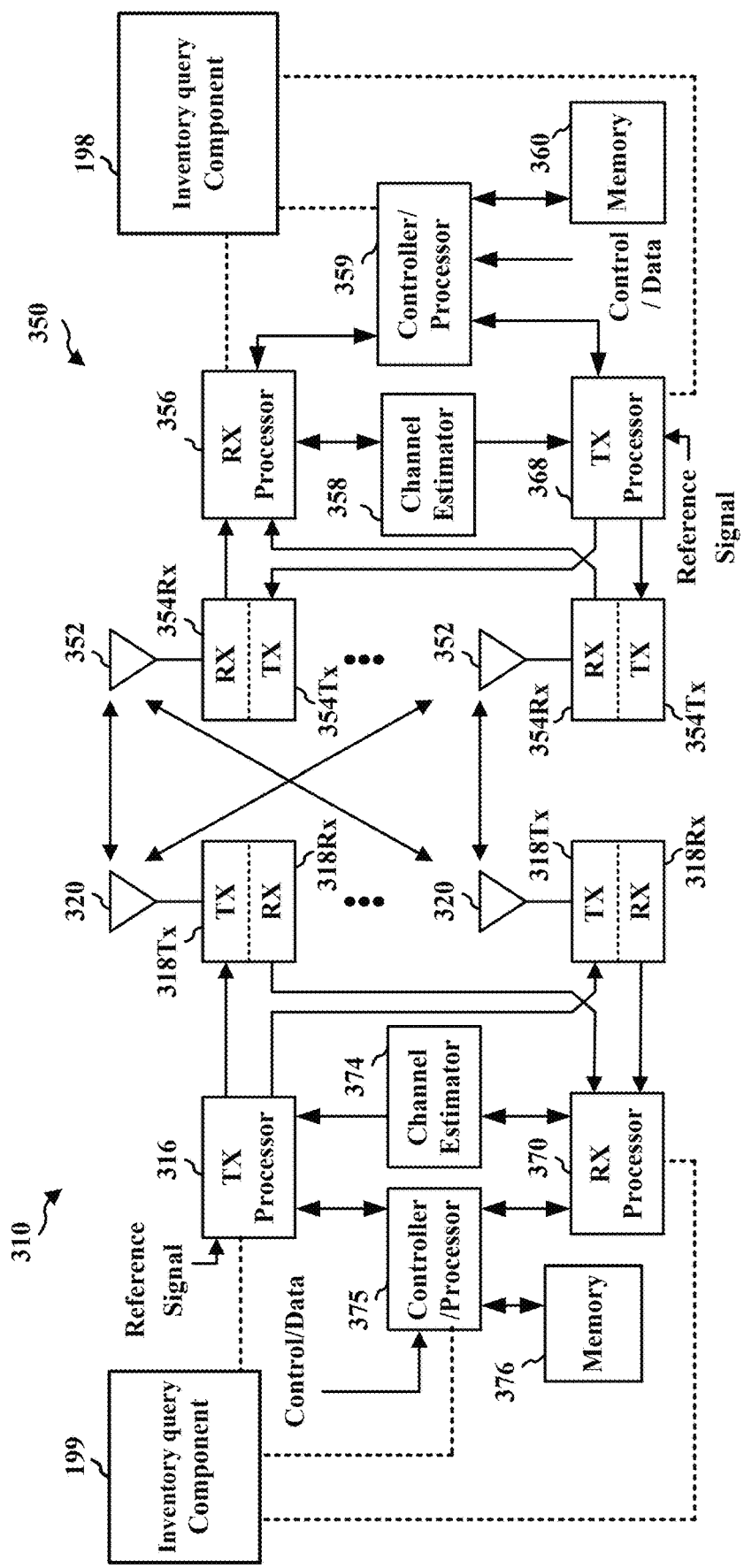
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the inventory query component 198 of FIG. 1, such as determining a first symbol duration for OOK modulation based on one or more of a SNR requirement, a BLER requirement, or a target MDP requirement for the IoT device; receiving, from a reader device (e.g., corresponding to the base station 102 in FIG. 1 and/or any other suitable RFID reader devices), an OOK transmission with a second symbol duration; and transmitting, to the reader device, a second OOK transmission in response to the received OOK transmission when the second symbol duration is the same as the first symbol duration.

At least one of the TX processor 316, the RX processor 370, and the controller/processor 375 may be configured to perform aspects in connection with the inventory query component 199 of FIG. 1, such as determining at least one symbol duration for communicating through OOK modulation with a set of devices (e.g., IoT devices, such as the UE 104 in FIG. 1), the at least one symbol duration being determined based on one or more of at least one SNR requirement, at least one BLER requirement for the set of devices, or a target missed detection probability for the set of devices; and transmitting, for each determined symbol duration of the at least one symbol duration, an OOK transmission with the determined symbol duration.

RFID technology is becoming increasingly important across various industries due to its potential for efficient inventory and asset management and is integral to the functioning of IoT networks. Specifically, passive RFID tags/transponders are notable for their cost-effectiveness and long lifecycle, as they operate without a battery by harvesting energy from an RFID reader's signal. When the information-bearing signal is reflected back (e.g., backscattered) from the passive IoT devices (e.g., IoT devices associated with passive RFID tags/transponders), the signal may be received and decoded by the gNB to facilitate various IoT applications. This will enable more efficient and reliable support for passive IoT devices, enhancing the overall performance of inventory management systems and other IoT-related processes in industrial environments.

Currently, 5G technology has been expanding into more industrial verticals beyond enhanced Mobile Broadband (eMBB). The 3GPP has developed specifications to support MTC, Narrowband IoT (NB-IoT), and Reduced Capability (RedCap) for various MTC use cases. However, existing 5G implementations face challenges in efficiently supporting pervasive RFID-type sensors (e.g., passive RFID tags/transponders), specifically in use cases such as asset management, logistics, warehousing, and manufacturing.

For the effective management of passive IoT devices, e.g., in the context of 3GPP Release 18 and beyond, the capabilities of improved networks (e.g., 6G network) may be configured such that the gNB may read and write information stored on passive IoT devices and may provide energy to passive IoT devices, ensuring operational capabilities of the associated passive RFID tags/transponders without the need for an internal power source.

When performing inventory management on IoT devices (e.g., performing inventory queries for IoT devices), synchronization and encoding techniques play important roles for ensuring reliable communication and efficient operation of RFID systems in various applications. A-IoT devices, a subset of IoT devices, are designed to function using low-cost technologies. A-IoT devices often have significant clock errors due to the absence of high-precision components like crystal oscillators. It is generally assumed that the local clocks in the A-IoT devices can have an error margin of up to 10% before calibration, a common assumption among various companies in 3GPP discussions. Given that, A-IoT devices normally operate in an asynchronous mode, relying on preamble detection to obtain initial timing estimates. To address the challenges associated with clock errors and synchronization in A-IoT devices, specific preamble structures and encoding methods are utilized. The preamble typically includes a start indicator followed by a clock acquisition part and the query command. For example, one example encoding technique is that the bit-to-chip mapping for Manchester encoding follows the pattern: bit 0 maps to chips {10}, and bit 1 maps to chips {01}. Variants of the mapping may also be considered for handling cyclic prefix (CP). Furthermore, the time acquisition signal, referred to as R2D (reader-to-device), includes options for start indicators and clock acquisition. The start-indicator part of the R2D signal can either be an ON/OFF pattern, indicating high and low voltage transmission, or an OFF pattern, indicating low voltage transmission. The clock-acquisition part of the R2D signal can be used for determining the OOK chip duration, with potential pattern designs to support the determination.

When performing the inventory process, a reader device (e.g., corresponding to the base station 102 in FIG. 1, and/or any other suitable RFID reader devices) aims to read all the A-IoT devices within a predetermined range. To effectively communicate with the A-IoT devices, the OOK transmission transmitted and/or received by the reader device should meet certain requirements (e.g., SNR requirement(s), BLER requirement(s), and/or target missed detection probability requirement(s)) of the A-IoT devices and/or the reader device.

When optimizing the efficiency and reliability of the inventory process across different A-IoT devices in varying distances from the reader device, several factors may be considered. For example, when receiving a same OOK transmission, A-IoT devices that are farther from the reader device will experience lower SNR due to signal attenuation over distance. OOK transmissions with different symbol durations (e.g., OOK symbol duration) may have varying SNR requirements to achieve the same probability of decoding error. For example, OOK transmissions with longer symbol durations require lower SNR to maintain the same target BLER and/or target MDP requirement, making OOK transmissions with longer symbol durations more reliable for distant A-IoT devices. On the other hand, OOK transmissions with shorter symbol durations are advantageous for increasing the data rate and reducing the overall inventory process time, as they allow for faster communication cycles. Therefore, balancing these factors may be beneficial for optimizing the efficiency and reliability of the inventory process across varying distances of A-IoT devices.

Figure 4:
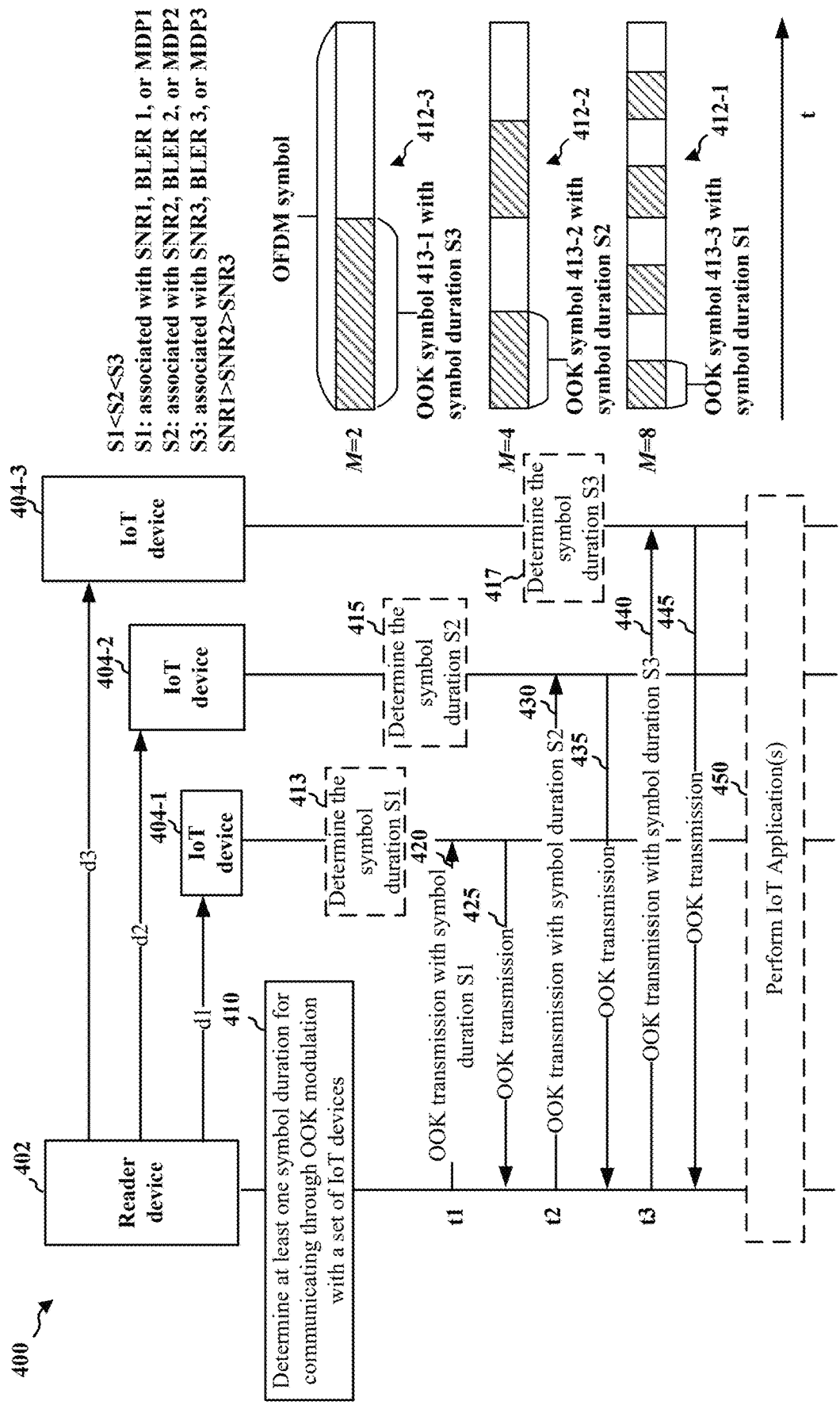
FIG. 4 is a call flow diagram illustrating a method of wireless communication, in accordance with various aspects of the present disclosure.

As noted above, the technical solutions disclosed herein involve performing RFID-based inventory queries for IoT devices using OOK transmission(s) with improved symbol duration(s) determined based on one or more requirements of the IoT devices. For example, FIG. 4 is a call flow diagram illustrating a method of wireless communication, in accordance with various aspects of the present disclosure. The method 400 may be performed between a reader device 402 and a set of devices (e.g., IoT devices 404). In some embodiments, the reader device 402 may correspond to the base station 102 in aggregation and/or by one or more components (e.g., such as a CU 110, a DU 130, and/or an RU 140) in FIG. 1, the base station 310 in aggregation and/or by one or more components in FIG. 3, and/or any other suitable RFID reader devices. Each IoT device 404-1, 404-2, or 404-3 may correspond to the UE 104 in FIG. 1 and/or the UE 350 in FIG. 3. It is understood that although three IoT devices 404 are shown in the flow diagram, more or fewer than three IoT devices may be included for performing the method 400, depending on desired performance.

As shown in FIG. 4, IoT devices 404-1, 404-2, and 404-3 are located at distances d1, d2, and d3 from the reader device 402, respectively. IoT device 404-1 is closer to the reader device 402 than IoT device 404-2 (d1<d2), and IoT device 404-2 is closer to the reader device 402 than IoT device 404-3 (d2<d3).

Starting from block 410, at least one symbol duration (e.g., symbol durations S1, S2, and/or S3) for communicating through OOK modulation (e.g., OOK-4 modulation) with a set of devices (e.g., IoT devices 404) may be determined based on one or more requirements of the set of devices. In some embodiments, the one or more requirements may include at least one SNR requirement (e.g., SNR1, SNR2, and/or SNR3), at least one BLER requirement (e.g., BLER1, BLER2, and/or BLER3), or at least one target MDP requirement (e.g., MDP1, MDP2, and/or MDP3), corresponding to IoT devices 404-1, 404-2, and/or 404-3, respectively.

Specifically, as noted above, OOK transmissions (e.g., OFDM signals with an OOK modulation) with longer OOK symbol durations may require lower SNR requirements to achieve the same BLER and/or MDP requirements compared with OOK transmissions with shorter OOK symbol durations. Additionally, IoT devices that are farther from the reader device will experience lower SNR due to signal attenuation over distance when receiving the same OOK transmission. Therefore, to accommodate the different distances of IoT devices 404-1, 404-2, and 404-3 from the reader device 402, and to increase the data rate and reduce the overall inventory process time, the OOK symbol durations for IoT devices 404-1, 404-2, and 404-3 may be determined differently. For example, to achieve the same BLER and/or MDP requirements at IoT devices 404-1, 404-2, and 404-3, the OOK symbol duration S1 determined for IoT device 404-1 may be shorter than the OOK symbol duration S2 determined for IoT device 404-2, and the OOK symbol duration S2 may be shorter than the OOK symbol duration S3 determined for IoT device 404-3.

Studies have shown that in OOK modulation schemes, different modulation orders (M) (e.g., the number of OOK symbols in an OFDM symbol) may correspond to different OOK symbol durations. Therefore, as a non-limiting example for configuring OOK symbol durations, different modulation orders M may be selected. For example, OFDM symbols 412-1, 412-2, and 412-3 may be modulated according to OOK-4 modulation with modulation orders of M=2, 4, and 8, respectively. According to OOK-4 modulation, each OFDM symbol 412 may be divided into M OOK symbols (e.g., M different ON/OFF or high/low chips, represented by shaded or empty portions in the corresponding OFDM symbol 412). As shown in FIG. 4, the larger the M value, the shorter the OOK symbol duration within the OFDM symbol 412. For example, OOK symbol 413-1 (corresponding to M=2) has a shorter OOK symbol duration S1 compared to the OOK symbol duration S2 of OOK symbol 413-2 (corresponding to M=4), and the OOK symbol duration S2 is shorter than the OOK symbol duration S3 of OOK symbol 413-3 (corresponding to M=8). It is appreciated that the examples provided herein are for illustrative purposes only. Other modulation techniques (e.g., OOK-1, OOK-2), different modulation orders (M), and various OOK symbol patterns in each OFDM symbol 412 may be configured to achieve different desired performance based on specific application requirements, device requirements, and/or environmental conditions.

At blocks 413, 415, and 417, IoT devices 404-1, 404-2, and 404-3 may determine the corresponding OOK symbol durations S1, S2, and S3 associated with the respective IoT devices 404 (e.g., based on one or more of an SNR requirement, a BLER requirement, or a target MDP requirement for the respective IoT device 404).

For example, in some embodiments, the OOK transmission configuration with the corresponding determined OOK symbol duration may be transmitted to the corresponding IoT device as priori and/or after the OOK symbol duration is determined by the reader device 402.

Upon receiving the OOK transmission configuration, the IoT device may determine the OOK symbol duration indicated in the configuration. Additionally or alternatively, the IoT device 404 may determine the corresponding OOK symbol duration based on the SNR requirement, the BLER requirement, or the target MDP requirement for the device, similar to the operations in block 410.

In some embodiments, the IoT device 404 may be configured to react only to the received OOK transmission having the determined symbol duration (e.g., reflect the received OOK transmission and/or transmit a responding OOK transmission). For example, the IoT device 404 may include a backscatter module configured to transmit backscatter-modulated information signals (e.g., an OOK transmission indicating information associated with the IoT device 404 for IoT applications, such as performing an inventory query in an IoT environment) responsive only to the received OOK transmission having an OOK symbol duration that matches the determined symbol duration. When receiving OOK transmissions with OOK symbol durations other than the determined duration, the backscatter module of the IoT device 404 may not react accordingly.

At arrow 420, an OOK transmission with OOK symbol duration S1 may be modulated and transmitted to the corresponding IoT device 404-1. In some embodiments, the OOK transmission may indicate a start of the OOK transmission, timing information (e.g., synchronization information and/or a current time), and a request for information of a subset of the IoT devices (e.g., one or more of IoT devices 404-1, 404-2, and 404-3) of the IoT devices 404. In some embodiments, the OOK transmission may be broadcast and/or transmitted targeting a predetermined region. At arrow 425, responsive to the matching of S1 with the OOK symbol duration determined by IoT device 404-1, an OOK transmission indicating the requested information may be transmitted from the IoT device 404-1 to the reader device 402 for IoT applications.

At arrows 430, 435, 440, and 445, OOK transmissions with OOK symbol durations S2 and S3, and the corresponding responding OOK transmissions, may be transmitted similarly to arrows 420 and 425. These operations will not be described in detail for case of illustration. In some embodiments, the OOK transmissions with different OOK symbol durations may be transmitted Time-Division Duplexed (TDD) (e.g., transmitted at different inventory rounds). For example, the transmissions at arrows 420, 430, and/or 440 may be performed at different time points (e.g., different time points t1, t2, and t3).

In some embodiments, at block 450, one or more IoT applications may be performed between the reader device 402 and the IoT devices 404 based on the information collected from the IoT devices 404.

By performing RFID-based inventory queries for IoT devices using OOK transmissions with improved symbol durations, the efficiency and reliability of the inventory process across varying distances of IoT devices may be enhanced.

Figure 5:
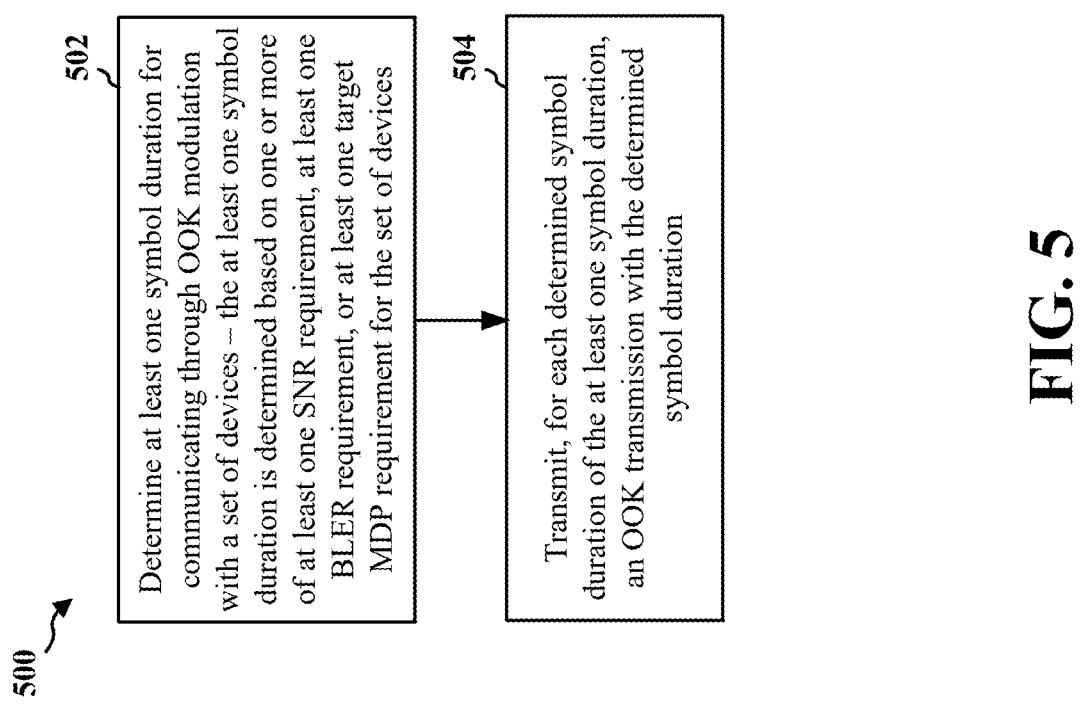
FIG. 5 is a flowchart of a method of wireless communication at a reader device, in accordance with various aspects of the present disclosure.

FIG. 5 is a flowchart 500 of a method of wireless communication, in accordance with various aspects of the present disclosure. The method may be performed by a reader device (e.g., the base station 102 in FIG. 1, either in aggregation or by one or more components such as a CU 110, a DU 130, and/or an RU 140; the base station 310 in FIG. 3, either in aggregation or by one or more components; the reader device 402 in FIG. 4; and/or the network entity 702 in the hardware implementation of FIG. 7). FIG. 4 illustrates various aspects of the steps in connection with flowchart 500.

At 502, the reader device may determine at least one symbol duration for communicating through OOK modulation with a set of devices. The symbol duration may be determined based on one or more of the following: at least one SNR requirement, at least one BLER requirement, or at least one target MDP requirement for the set of devices. For example, the set of devices may correspond to the UE 104 in FIG. 1, the UE 350 in FIG. 3, the IoT device 404 in FIG. 4, and/or the apparatus 604 in the hardware implementation of FIG. 6. As discussed with respect to FIG. 4, at block 410, at least one symbol duration (e.g., symbol durations S1, S2, and/or S3) for communicating through OOK modulation (e.g., OOK-4 modulation) with a set of devices (e.g., IoT devices 404) may be determined based on one or more requirements of the IoT devices 404. These requirements may include at least one SNR requirement (e.g., SNR1, SNR2, and/or SNR3), at least one BLER requirement (e.g., BLER1, BLER2, and/or BLER3), or at least one target MDP requirement (e.g., MDP1, MDP2, and/or MDP3), corresponding to IoT devices 404-1, 404-2, and 404-3, respectively. In some embodiments, functionalities at 502 may be performed by the inventory query component 199 of the network entity 702 in the hardware implementation of FIG. 7.

In some embodiments, determining the at least one symbol duration may include determining at least one OOK symbol duration. For example, as discussed with respect to FIG. 4, different OOK symbol durations S1, S2, and S3 may be determined for IoT devices 404-1, 404-2, and 404-3 respectively.

In some embodiments, determining each OOK symbol duration of the at least one OOK symbol duration may involve determining the number of OOK symbols within an OFDM symbol for the OOK transmission or determining a modulation order for the OOK transmission. For example, as discussed with respect to FIG. 4, different modulation orders (M) (e.g., the number of OOK symbols in an OFDM symbol) may be selected for configuring OOK symbol durations. As shown in FIG. 4, the larger the M value, the shorter the OOK symbol duration within the OFDM symbol, as illustrated by OFDM symbols 412.

In some embodiments, the at least one symbol duration may include one symbol duration determined based on one or more of an SNR requirement of the at least one SNR requirement, a BLER requirement of the at least one BLER requirement, or a target MDP of the at least one target MDP of a device of the set of devices that is located a threshold distance away from the reader device. For example, as discussed with respect to FIG. 4, different OOK symbol durations S1, S2, and S3 may be determined based on the SNR, BLER, and/or MDP requirements of the corresponding IoT devices located a threshold distance (e.g., d1, d2, and/or d3) away from the reader device 402.

In some embodiments, the at least one symbol duration may include a first symbol duration determined based on one or more of a first SNR requirement of the at least one SNR requirement, a first BLER requirement of the at least one BLER requirement, or a first target MDP of the at least one target MDP requirement of a first device of the set of devices that is located a threshold distance away from the reader device; and a second symbol duration determined based on one or more of a second SNR requirement of the at least one SNR requirement, a second BLER requirement of the at least one BLER requirement, or a second target MDP of the at least one target MDP requirement of a second device of the set of devices that is located within the threshold distance of the reader device, wherein the first symbol duration is longer than the second symbol duration. For example, as discussed with respect to FIG. 4, the determined symbol durations may include a first symbol duration (e.g., symbol duration S2 in FIG. 4) determined based on one or more of a first SNR requirement (e.g., SNR2 in FIG. 4) of the at least one SNR requirement, a first BLER requirement (e.g., BLER2 in FIG. 4) of the at least one BLER requirement, or a first target MDP (e.g., MDP2 in FIG. 4) of the at least one target MDP requirement of a first device (e.g., IoT 404-2) of the set of devices that is located a threshold distance (d2) away from the reader device 402; and a second symbol duration (e.g., symbol duration S1 in FIG. 4) determined based on one or more of a second SNR requirement (e.g., SNR1 in FIG. 4) of the at least one SNR requirement, a second BLER requirement (e.g., BLER2 in FIG. 4) of the at least one BLER requirement, or a second target MDP of the at least one target MDP requirement (e.g., MDP1 in FIG. 4) of a second device (e.g., IoT 404-1) of the set of devices that is located within the threshold distance (e.g., d1<d2) of the reader device 402, wherein the first symbol duration is longer than the second symbol duration (e.g., S2>S1).

In some embodiments, the at least one symbol duration may include: N symbol durations determined based on one or more of N SNR requirements of the at least one SNR requirement, N BLER requirements of the at least one BLER requirement, or N target MDP requirements of the at least one target MDP requirement of the set of devices, each symbol duration of the N symbol durations is determined based on a different distance between a respective subset of devices of the set of devices and the reader device. For example, as discussed with respect to FIG. 4, more or fewer than three symbol durations associated with more or fewer than three IoT devices may be determined based on the different distances between a respective subset of devices (e.g., one or more of IoT devices 404-1, 404-2, and 404-3) within the set of devices (e.g., IoT devices 404) and the reader device 402.

In some embodiments, the at least one symbol duration comprises at least two symbol durations, and the OOK transmissions are transmitted TDD. For example, referring to FIG. 4, at least the symbol durations S1 and S2 are determined, and the OOK transmissions with OOK symbol durations S1 and S2 may be transmitted at different time points t1 and t2. Specifically, the functionalities at arrows 420 and 430 may be performed at t1 and t2, respectively.

In some embodiments, each OOK transmission may indicate the start of the OOK transmission, timing information, and a request for information from a subset of the devices in the set of devices. As discussed with respect to FIG. 4, the OOK transmission may indicate the start of the OOK transmission, timing information (e.g., synchronization information and/or a current time), and a request for information from a subset of the IoT devices (e.g., one or more of IoT devices 404-1, 404-2, and 404-3) within the IoT devices 404.

In some embodiments, the set of devices may include one or more IoT devices. As discussed with respect to FIG. 4, the set of devices may include IoT devices 404.

At 504, the reader device may transmit for each determined symbol duration of the at least one symbol duration, an OOK transmission with the determined symbol duration. For example, at arrows 420, 430, or 440 in FIG. 4, OOK transmissions with OOK symbol durations S2 and S3 may be transmitted to the corresponding IoT devices 404. In some embodiments, functionalities at 504 may be performed by inventory query component 199 of the network entity 702 in the hardware implementation of FIG. 7.

Figure 6:
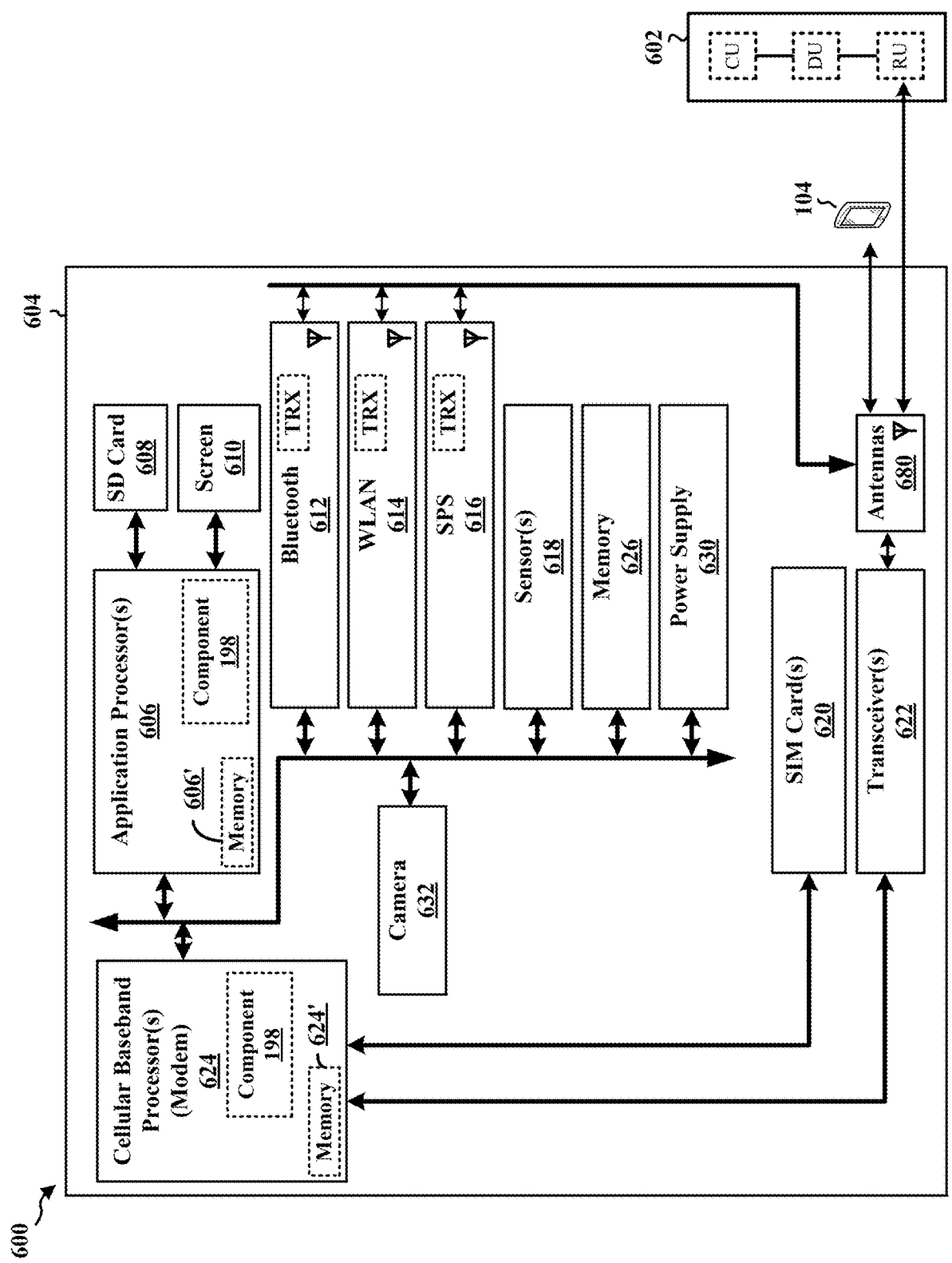
FIG. 6 is a diagram illustrating an example of a hardware implementation for an example apparatus and/or network entity.

FIG. 6 is a diagram 600 illustrating an example of a hardware implementation for an apparatus 604. The apparatus 604 may be a UE, a component of a UE, or may implement UE functionality. In some aspects, the apparatus 604 may include at least one cellular baseband processor 624 (also referred to as a modem) coupled to one or more transceivers 622 (e.g., cellular RF transceiver). The cellular baseband processor(s) 624 may include at least one on-chip memory 624'. In some aspects, the apparatus 604 may further include one or more subscriber identity modules (SIM) cards 620 and at least one application processor 606 coupled to a secure digital (SD) card 608 and a screen 610. The application processor(s) 606 may include on-chip memory 606'. In some aspects, the apparatus 604 may further include a Bluetooth module 612, a WLAN module 614, an SPS module 616 (e.g., GNSS module), one or more sensor modules 618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 626, a power supply 630, and/or a camera 632. The Bluetooth module 612, the WLAN module 614, and the SPS module 616 may include an on-chip transceiver (TRX) (or in some cases, just a receiver (RX)). The Bluetooth module 612, the WLAN module 614, and the SPS module 616 may include their own dedicated antennas and/or utilize the antennas 680 for communication. The cellular baseband processor(s) 624 communicates through the transceiver(s) 622 via one or more antennas 680 with the UE 104 and/or with an RU associated with a network entity 602. The cellular baseband processor(s) 624 and the application processor(s) 606 may each include a computer-readable medium/memory 624', 606', respectively. The additional memory modules 626 may also be considered a computer-readable medium/memory. Each computer-readable medium/memory 624', 606', 626 may be non-transitory. The cellular baseband processor(s) 624 and the application processor(s) 606 are each responsible for general processing, including the execution of software stored on the computer-readable medium/memory. The software, when executed by the cellular baseband processor(s) 624/application processor(s) 606, causes the cellular baseband processor(s) 624/application processor(s) 606 to perform the various functions described supra. The cellular baseband processor(s) 624 and the application processor(s) 606 are configured to perform the various functions described supra based at least in part of the information stored in the memory. That is, the cellular baseband processor(s) 624 and the application processor(s) 606 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 624/application processor(s) 606 when executing software. The cellular baseband processor(s) 624/application processor(s) 606 may be a component of the UE 350 and may include the at least one memory 360 and/or at least one of the TX processor 368, the RX processor 356, and the controller/processor 359. In one configuration, the apparatus 604 may be at least one processor chip (modem and/or application) and include just the cellular baseband processor(s) 624 and/or the application processor(s) 606, and in another configuration, the apparatus 604 may be the entire UE (e.g., see UE 350 of FIG. 3) and include the additional modules of the apparatus 604.

As discussed supra, the component 198 may be configured to determine a first symbol duration for a SNR requirement, a BLER requirement, or a target MDP requirement for the apparatus 604; receive, from a reader device, an OOK transmission with a second symbol duration; and transmit, to the reader device, a second OOK transmission in response to the received OOK transmission when the second symbol duration is the same as the first symbol duration. The component 198 may be within the cellular baseband processor(s) 624, the application processor(s) 606, or both the cellular baseband processor(s) 624 and the application processor(s) 606. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 604 may include a variety of components configured for various functions. In one configuration, the apparatus 604, and in particular the cellular baseband processor(s) 624 and/or the application processor(s) 606, may include means for determining a first symbol duration for a SNR requirement, a BLER requirement, or a target MDP requirement for the apparatus 604; means for receiving, from a reader device, an OOK transmission with a second symbol duration; and means for transmitting, to the reader device, a second OOK transmission in response to the received OOK transmission when the second symbol duration is the same as the first symbol duration. The means may be the component 198 of the apparatus 604 configured to perform the functions recited by the means. As described supra, the apparatus 604 may include the TX processor 368, the RX processor 356, and the controller/processor 359. As such, in one configuration, the means may be the TX processor 368, the RX processor 356, and/or the controller/processor 359 configured to perform the functions recited by the means.

Figure 7:
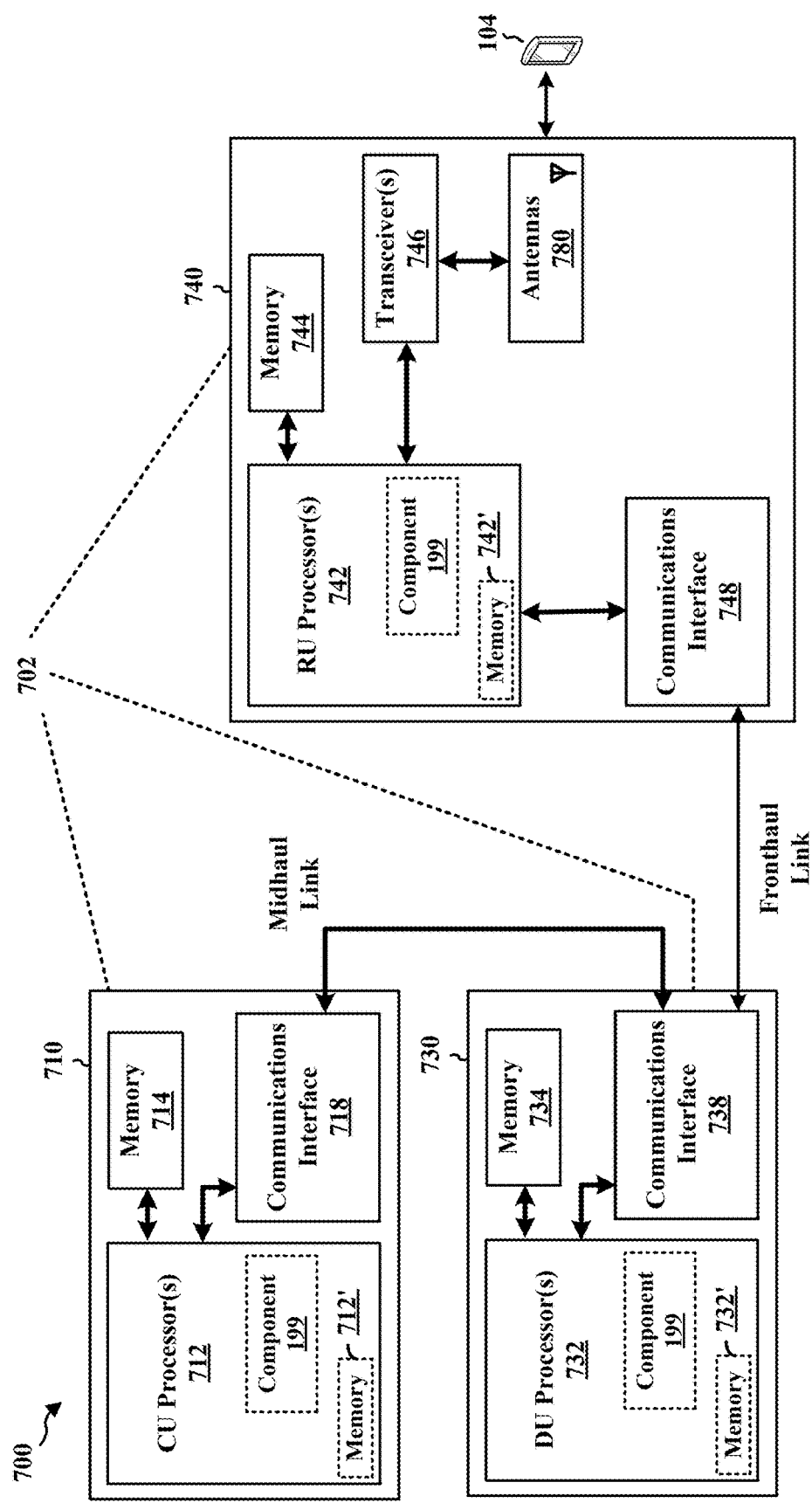
FIG. 7 is a diagram illustrating an example of a hardware implementation for an example network entity.

FIG. 7 is a diagram 700 illustrating an example of a hardware implementation for a network entity 702. The network entity 702 may be a BS, a component of a BS, or may implement BS functionality. The network entity 702 may include at least one of a CU 710, a DU 730, or an RU 740. For example, depending on the layer functionality handled by the component 199, the network entity 702 may include the CU 710; both the CU 710 and the DU 730; each of the CU 710, the DU 730, and the RU 740; the DU 730; both the DU 730 and the RU 740; or the RU 740. The CU 710 may include at least one CU processor 712. The CU processor(s) 712 may include on-chip memory 712'. In some aspects, the CU 710 may further include additional memory modules 714 and a communications interface 718. The CU 710 communicates with the DU 730 through a midhaul link, such as an F1 interface. The DU 730 may include at least one DU processor 732. The DU processor(s) 732 may include on-chip memory 732'. In some aspects, the DU 730 may further include additional memory modules 734 and a communications interface 738. The DU 730 communicates with the RU 740 through a fronthaul link. The RU 740 may include at least one RU processor 742. The RU processor(s) 742 may include on-chip memory 742'. In some aspects, the RU 740 may further include additional memory modules 744, one or more transceivers 746, antennas 780, and a communications interface 748. The RU 740 communicates with the UE 104. The on-chip memory 712', 732', 742' and the additional memory modules 714, 734, 744 may each be considered a computer-readable medium/memory. Each computer-readable medium/memory may be non-transitory. Each of the processors 712, 732, 742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to determine at least one symbol duration for communicating through OOK modulation with a set of devices, the at least one symbol duration being determined based on one or more of at least one SNR requirement, at least one BLER requirement, or at least one target MDP requirement for the set of devices; and transmit for each determined symbol duration of the at least one symbol duration, an OOK transmission with the determined symbol duration. The component 199 may be within one or more processors of one or more of the CU 710, DU 730, and the RU 740. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 702 may include a variety of components configured for various functions. In one configuration, the network entity 702 may include means for determining at least one symbol duration for communicating through OOK modulation with a set of devices, the at least one symbol duration being determined based on one or more of at least one SNR requirement, at least one BLER requirement, or at least one target MDP requirement for the set of devices; and means for transmitting for each determined symbol duration of the at least one symbol duration, an OOK transmission with the determined symbol duration. The means may be the component 199 of the network entity 702 configured to perform the functions recited by the means. As described supra, the network entity 702 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a reader device. Some aspects more specifically relate to optimizing symbol durations in RFID-based inventory systems for IoT devices. In some examples, when performing RFID-based inventory queries for IoT devices, at least one symbol duration for communicating through OOK modulation with a set of IoT devices may be determined based on one or more of the following: at least one SNR requirement, at least one BLER requirement, or at least one target MDP requirement for the set of devices. For each determined symbol duration, an OOK transmission with the determined symbol duration may be transmitted to perform the inventory query (e.g., obtaining information of the ambient-IoT (A-IoT) devices and/or other IoT applications).

Particular aspects of the subject matter described in this disclosure can be implemented to realize one or more of the following potential advantages. In some examples, by configuring OOK transmissions used for inventory queries with different symbol durations determined based on different SNR requirements, BLER requirements, and/or target missed detection probability requirements for different IoT devices, the described techniques can be used to enhance the efficiency and reliability of those inventory queries in IoT environments.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented. The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a reader device, comprising: determining at least one symbol duration for communicating through OOK modulation with a set of devices, the at least one symbol duration being determined based on one or more of at least one SNR requirement, at least one BLER requirement, or at least one target MDP requirement for the set of devices; and transmitting, for each determined symbol duration of the at least one symbol duration, an OOK transmission with the determined symbol duration.

Aspect 2 is the method of aspect 1, wherein determining the at least one symbol duration comprises determining at least one OOK symbol duration.

Aspect 3 is the method of any of aspects 1 and 2, wherein determining each OOK symbol duration of the at least one OOK symbol duration comprises determining a number of OOK symbols within an OFDM symbol for the OOK transmission or determining a modulation order for the OOK transmission.

Aspect 4 is the method of any of aspects 1 to 3, wherein the at least one symbol duration comprises: one symbol duration determined based on one or more of an SNR requirement of the at least one SNR requirement, a BLER requirement of the at least one BLER requirement, or a target MDP of the at least one target MDP requirement of a device of the set of devices that is located a threshold distance away from the reader device.

Aspect 5 is the method of any of aspects 1 to 4, wherein the at least one symbol duration comprises: a first symbol duration determined based on one or more of a first SNR requirement of the at least one SNR requirement, a first BLER requirement of the at least one BLER requirement, or a first target MDP of the at least one target MDP requirement of a first device of the set of devices that is located a threshold distance away from the reader device; and a second symbol duration determined based on one or more of a second SNR requirement of the at least one SNR requirement, a second BLER requirement of the at least one BLER requirement, or a second target MDP of the at least one target MDP requirement of a second device of the set of devices that is located within the threshold distance of the reader device, wherein the first symbol duration is longer than the second symbol duration.

Aspect 6 is the method of any of aspects 1 to 5, N symbol durations determined based on one or more of N SNR requirements of the at least one SNR requirement, N BLER requirements of the at least one BLER requirement, or N target MDP requirements of the at least one target MDP requirement of the set of devices, each symbol duration of the N symbol durations is determined based on a different distance between a respective subset of devices of the set of devices and the reader device.

Aspect 7 is the method of any of aspects 1 to 6, wherein the at least one symbol duration comprises at least two symbol durations, and wherein the OOK transmissions are transmitted TDD.

Aspect 8 is the method of any of aspects 1 to 7, wherein each OOK transmission indicates a start of the OOK transmission, timing information, and a request for information of a subset of devices of the set of devices.

Aspect 9 is the method of any of aspects 1 to 8, wherein the set of devices comprise one or more Internet of Things (IoT) devices.

Aspect 10 is an apparatus for wireless communication at a reader device, comprising: at least one memory; and at least one processor coupled to the at least one memory, the at least one processor, individually or in any combination, is configured to perform the method of any of aspects 1 to 9.

Aspect 11 is an apparatus for wireless communication at a reader device, comprising means for performing each step in the method of any of aspects 1 to 9.

Aspect 12 is a method of wireless communication at an IoT device, comprising: determining a first symbol duration for OOK modulation associated with one or more of a SNR requirement, a BLER requirement, or a target MDP requirement for the IoT device; receiving, from a reader device, an OOK transmission with a second symbol duration; and transmitting, to the reader device, a second OOK transmission in response to the received OOK transmission when the second symbol duration is the same as the first symbol duration.

What is claimed is:
1. An apparatus for wireless communication at a reader device, comprising:
at least one memory; and
at least one processor coupled to the at least one memory and, based at least in part on information stored in the at least one memory, the at least one processor, individually or in any combination, is configured to:
  determine at least one symbol duration for communicating through on-off keying (OOK) modulation with a set of devices, the at least one symbol duration being determined based on one or more of at least one signal to noise ratio (SNR) requirement, at least one block error rate (BLER) requirement, or at least one target missed detection probability (MDP) requirement for the set of devices; and
  transmit, for each determined symbol duration of the at least one symbol duration, an OOK transmission with the determined symbol duration.

2. The apparatus of claim 1, wherein to determine the at least one symbol duration, the at least one processor is configured to:
  determine at least one OOK symbol duration.

3. The apparatus of claim 2, wherein to determine each OOK symbol duration of the at least one OOK symbol duration, the at least one processor is configured to:
  determine a number of OOK symbols within an orthogonal frequency-division multiplexing (OFDM) symbol for the OOK transmission or determining a modulation order for the OOK transmission.

4. The apparatus of claim 1, wherein the at least one symbol duration comprises:
  one symbol duration determined based on one or more of an SNR requirement of the at least one SNR requirement, a BLER requirement of the at least one BLER requirement, or a target MDP of the at least one target MDP requirement of a device of the set of devices that is located a threshold distance away from the reader device.

5. The apparatus of claim 1, wherein the at least one symbol duration comprises:
  a first symbol duration determined based on one or more of a first SNR requirement of the at least one SNR requirement, a first BLER requirement of the at least one BLER requirement, or a first target MDP of the at least one target MDP requirement of a first device of the set of devices that is located a threshold distance away from the reader device; and
  a second symbol duration determined based on one or more of a second SNR requirement of the at least one SNR requirement, a second BLER requirement of the at least one BLER requirement, or a second target MDP of the at least one target MDP requirement of a second device of the set of devices that is located within the threshold distance of the reader device, wherein the first symbol duration is longer than the second symbol duration.

6. The apparatus of claim 1, wherein the at least one symbol duration comprises:
  N symbol durations, where N is a positive integer, determined based on one or more of N SNR requirements of the at least one SNR requirement, N BLER requirements of the at least one BLER requirement, or N target MDP requirements of the at least one target MDP requirement of the set of devices, each symbol duration of the N symbol durations is determined based on a different distance between a respective subset of devices of the set of devices and the reader device.

7. The apparatus of claim 1, wherein the at least one symbol duration comprises at least two symbol durations, and wherein the OOK transmissions are transmitted Time-Division Duplexed (TDD).

8. The apparatus of claim 1, wherein each OOK transmission indicates a start of the OOK transmission, timing information, and a request for information of a subset of devices of the set of devices.

9. The apparatus of claim 1, wherein the set of devices comprise one or more Internet of Things (IoT) devices.

10. A method of wireless communication of a reader device, comprising:
  determining at least one symbol duration for communicating through on-off keying (OOK) modulation with a set of devices, the at least one symbol duration being determined based on one or more of at least one signal to noise ratio (SNR) requirement, at least one block error rate (BLER) requirement, or at least one target missed detection probability (MDP) requirement for the set of devices; and
  transmitting, for each determined symbol duration of the at least one symbol duration, an OOK transmission with the determined symbol duration.

11. The method of claim 10, wherein determining the at least one symbol duration comprises determining at least one OOK symbol duration.

12. The method of claim 11, wherein determining each OOK symbol duration of the at least one OOK symbol duration comprises determining a number of OOK symbols within an orthogonal frequency-division multiplexing (OFDM) symbol for the OOK transmission or determining a modulation order for the OOK transmission.

13. The method of claim 10, wherein the at least one symbol duration comprises:
  one symbol duration determined based on one or more of an SNR requirement of the at least one SNR requirement, a BLER requirement of the at least one BLER requirement, or a target MDP of the at least one target MDP requirement of a device of the set of devices that is located a threshold distance away from the reader device.

14. The method of claim 10, wherein the at least one symbol duration comprises:
  a first symbol duration determined based on one or more of a first SNR requirement of the at least one SNR requirement, a first BLER requirement of the at least one BLER requirement, or a first target MDP of the at least one target MDP requirement of a first device of the set of devices that is located a threshold distance away from the reader device; and
  a second symbol duration determined based on one or more of a second SNR requirement of the at least one SNR requirement, a second BLER requirement of the at least one BLER requirement, or a second target MDP of the at least one target MDP requirement of a second device of the set of devices that is located within the threshold distance of the reader device, wherein the first symbol duration is longer than the second symbol duration.

15. The method of claim 10, wherein the at least one symbol duration comprises:
  N symbol durations, where N is a positive integer, determined based on one or more of N SNR requirements of the at least one SNR requirement, N BLER requirements of the at least one BLER requirement, or N target MDP requirements of the at least one target MDP requirement of the set of devices, each symbol duration of the N symbol durations is determined based on a different distance between a respective subset of devices of the set of devices and the reader device.

16. The method of claim 10, wherein the at least one symbol duration comprises at least two symbol durations, and wherein the OOK transmissions are transmitted Time-Division Duplexed (TDD).

17. The method of claim 10, wherein each OOK transmission indicates a start of the OOK transmission, timing information, and a request for information of a subset of devices of the set of devices.

18. The method of claim 10, wherein the set of devices comprise one or more Internet of Things (IoT) devices.

19. An apparatus for wireless communication at a reader device, comprising:
    means for determining at least one symbol duration for communicating through on-off keying (OOK) modulation with a set of devices, the at least one symbol duration being determined based on one or more of at least one signal to noise ratio (SNR) requirement, at least one block error rate (BLER) requirement, or at least one target missed detection probability (MDP) requirement for the set of devices; and
    means for transmitting, for each determined symbol duration of the at least one symbol duration, an OOK transmission with the determined symbol duration.

20. The apparatus of claim 19, wherein the means for determining the at least one symbol duration comprises means for determining at least one OOK symbol duration.

* * * * *